US011593255B2

(12) United States Patent
Dundigalla et al.

(10) Patent No.: US 11,593,255 B2
(45) Date of Patent: Feb. 28, 2023

(54) MOBILE LOG HEATMAP-BASED AUTO TESTCASE GENERATION

(71) Applicant: Bank of America Corporation, Charlotte, NC (US)

(72) Inventors: Srinivas Dundigalla, Charlotte, NC (US); Pavan Kumar Chayanam, Alamo, CA (US); Sandeep Verma, Gurugram (IN); Jaimish H. Patel, Apex, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/944,417

(22) Filed: Jul. 31, 2020

(65) Prior Publication Data
US 2022/0035730 A1 Feb. 3, 2022

(51) Int. Cl.
*G06F 11/36* (2006.01)
(52) U.S. Cl.
CPC ........ *G06F 11/3684* (2013.01); *G06F 11/368* (2013.01); *G06F 11/3664* (2013.01); *G06F 11/3688* (2013.01); *G06F 11/3692* (2013.01)
(58) Field of Classification Search
CPC ............. G06F 11/3684; G06F 11/3664; G06F 11/368; G06F 11/3688; G06F 11/3692; G06F 11/36–3696
See application file for complete search history.

(56) References Cited

U.S. PATENT DOCUMENTS

| 5,168,563 | A | * | 12/1992 | Shenoy | ................... | G06F 11/34 |
| | | | | | | 703/19 |
| 7,590,589 | B2 | | 9/2009 | Hoffberg | | |
| 7,950,004 | B2 | | 5/2011 | Vieira et al. | | |
| 8,275,855 | B2 | | 9/2012 | Kothari et al. | | |
| 8,370,809 | B2 | | 2/2013 | Lawrance et al. | | |
| 8,418,000 | B1 | | 4/2013 | Salame | | |
| 8,516,449 | B2 | | 8/2013 | Artzi et al. | | |
| 9,021,443 | B1 | | 4/2015 | Lachwani et al. | | |
| 9,183,119 | B2 | | 11/2015 | Li et al. | | |

(Continued)

OTHER PUBLICATIONS

Anderson, Jeff, et al. "On the use of usage patterns from telemetry data for test case prioritization." Information and Software Technology 113 (2019): 110-130. (Year: 2019).*

(Continued)

*Primary Examiner* — S. Sough
*Assistant Examiner* — Joanne G Macasiano
(74) *Attorney, Agent, or Firm* — Moore & Van Allen PLLC; Seongun M. Hong

(57) ABSTRACT

A system is provided for mobile log heatmap-based auto test case generation. In particular, the system may continuously track and log user actions and data flows for applications within the production environment. Based on the logs, the system may generate a navigation network graph through which the system may identify all possible navigation paths that may be taken by the user to access certain functions or screens of the application. Once the paths have been identified, the system may collect and sanitize testing data based on user session and system interaction data in the production environment. The testing data may then be used to drive the development of the next release or version of the application.

14 Claims, 2 Drawing Sheets

(56) References Cited

U.S. PATENT DOCUMENTS

| | | |
|---|---|---|
| 9,274,763 B2 | 3/2016 | Allsbrook |
| 9,335,979 B1 | 5/2016 | Bryan et al. |
| 9,354,998 B2 | 5/2016 | Hyland et al. |
| 9,367,435 B2 | 6/2016 | Sinyagin et al. |
| 9,449,190 B2 | 9/2016 | Centonze et al. |
| 9,459,994 B2 | 10/2016 | Koneru et al. |
| 9,519,695 B2 | 12/2016 | Sampathkumaran et al. |
| 10,223,246 B2 | 3/2019 | Pasala et al. |
| 10,412,210 B2 | 9/2019 | Bjontegard |
| 10,609,575 B2 | 3/2020 | Elliott et al. |
| 2009/0019428 A1* | 1/2009 | Li .................... G06F 11/3676 717/128 |
| 2014/0108583 A1 | 4/2014 | Kulkarni et al. |
| 2015/0143339 A1* | 5/2015 | Rajanna .................. G06F 8/75 717/123 |
| 2015/0302398 A1 | 10/2015 | Desai et al. |
| 2017/0242713 A1* | 8/2017 | Darie .................... G06F 9/453 |
| 2018/0129594 A1* | 5/2018 | Singi .................... G06F 11/00 |
| 2018/0196731 A1 | 7/2018 | Moorthi et al. |
| 2018/0210817 A1* | 7/2018 | Kelly .................... G06F 16/27 |
| 2021/0081308 A1* | 3/2021 | Golubev ............ G06F 11/3438 |
| 2022/0035640 A1* | 2/2022 | Daei .................... G06N 3/08 |

OTHER PUBLICATIONS

Muthusamy, Thillaikarasi, and K. Seetharaman. "A new effective test case prioritization for regression testing based on prioritization algorithm." Int. J. Appl. Inf. Syst.(IJAIS) 6.7 (2014): 21-26. (Year: 2014).*

* cited by examiner

MOBILE LOG HEATMAP-BASED AUTO TESTCASE GENERATION

FIELD OF THE INVENTION

The present disclosure embraces a system for mobile log heatmap-based auto test case generation.

BACKGROUND

There is a need for an efficient way to generate test cases and testing data for application development.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for mobile log heatmap-based auto test case generation. In particular, the system may continuously track and log user actions and data flows for applications within the production environment. Based on the logs, the system may generate a navigation network graph through which the system may identify all possible navigation paths that may be taken by the user to access certain functions or screens of the application. Once the paths have been identified, the system may collect and sanitize testing data based on user session and system interaction data in the production environment. The testing data may then be used to drive the development of the next release or version of the application.

Accordingly, embodiments of the present disclosure provide a system for mobile log heatmap-based auto test case generation. The system may comprise a memory device with computer-readable program code stored thereon; a communication device; and a processing device operatively coupled to the memory device and the communication device, wherein the processing device is configured to execute the computer-readable program code to continuously log user actions within an application within a production environment; based on the user actions, identify, using a machine learning mechanism, one or more navigation paths taken by one or more users within the application; generate a navigation network graph comprising the one or more navigation paths taken by the one or more users within the application; aggregate, within the product environment, testing data associated with the one or more navigation paths; based on the one or more navigation paths and the testing data, generate one or more test case s associated with the application; and provision the one or more test case s and the testing data associated with the one or more test cases to a lower level testing environment.

In some embodiments, provisioning the one or more test case s and the testing data associated with the one or more test cases comprises detecting sensitive information within the testing data associated with the one or more test cases; and replacing the sensitive information with synthetic data to generate sanitized testing data.

In some embodiments, the computer-readable program code further causes the processing device to generate a list of the one or more navigation paths ordered by frequency; and provision the list to the lower level testing environment.

In some embodiments, the computer-readable program code further causes the processing device to generate a list of the one or more navigation paths ordered by path length; and provision the list to the lower level testing environment.

In some embodiments, each of the one or more navigation paths comprises one or more screens within the application and one or more path directions between the one or more screens within the application.

In some embodiments, the navigation network graph is stored in a graph database, wherein each of the one or more screens within the application are stored as a node within the graph database, wherein each of the one or more path directions are stored as an edge within the graph database.

In some embodiments, the testing data associated with the one or more navigation paths comprises user session information and system information.

Embodiments of the present disclosure also provide a computer program product for mobile log heatmap-based auto test case generation. The computer program product may comprise at least one non-transitory computer readable medium having computer-readable program code portions embodied therein, the computer-readable program code portions comprising executable code portions for continuously logging user actions within an application within a production environment; based on the user actions, identifying, using a machine learning mechanism, one or more navigation paths taken by one or more users within the application; generating a navigation network graph comprising the one or more navigation paths taken by the one or more users within the application; aggregating, within the product environment, testing data associated with the one or more navigation paths; based on the one or more navigation paths and the testing data, generating one or more test cases associated with the application; and provisioning the one or more test cases and the testing data associated with the one or more test cases to a lower level testing environment.

In some embodiments, provisioning the one or more test cases and the testing data associated with the one or more test cases comprises detecting sensitive information within the testing data associated with the one or more test cases; and replacing the sensitive information with synthetic data to generate sanitized testing data.

In some embodiments, the computer-readable program code portions further comprise executable code portions for generating a list of the one or more navigation paths ordered by frequency; and provisioning the list to the lower level testing environment.

In some embodiments, the computer-readable program code portions further comprise executable code portions for generating a list of the one or more navigation paths ordered by path length; and provisioning the list to the lower level testing environment.

In some embodiments, each of the one or more navigation paths comprises one or more screens within the application and one or more path directions between the one or more screens within the application.

In some embodiments, the navigation network graph is stored in a graph database, wherein each of the one or more screens within the application are stored as a node within the graph database, wherein each of the one or more path directions are stored as an edge within the graph database.

Embodiments of the present disclosure also provide a computer-implemented method for mobile log heatmap-based auto test case generation, wherein the computer-implemented method comprises continuously logging user actions within an application within a production environment; based on the user actions, identifying, using a machine learning mechanism, one or more navigation paths taken by one or more users within the application; generating a navigation network graph comprising the one or more navigation paths taken by the one or more users within the application; aggregating, within the product environment, testing data associated with the one or more navigation paths; based on the one or more navigation paths and the testing data, generating one or more test cases associated with the application; and provisioning the one or more test cases and the testing data associated with the one or more test cases to a lower level testing environment.

In some embodiments, provisioning the one or more test cases and the testing data associated with the one or more test cases comprises detecting sensitive information within the testing data associated with the one or more test cases; and replacing the sensitive information with synthetic data to generate sanitized testing data.

In some embodiments, the computer-implemented method further comprises generating a list of the one or more navigation paths ordered by frequency; and provisioning the list to the lower level testing environment.

In some embodiments, the computer-implemented method further comprises generating a list of the one or more navigation paths ordered by path length; and provisioning the list to the lower level testing environment.

In some embodiments, each of the one or more navigation paths comprises one or more screens within the application and one or more path directions between the one or more screens within the application.

In some embodiments, the navigation network graph is stored in a graph database, wherein each of the one or more screens within the application are stored as a node within the graph database, wherein each of the one or more path directions are stored as an edge within the graph database.

In some embodiments, the testing data associated with the one or more navigation paths comprises user session information and system information.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
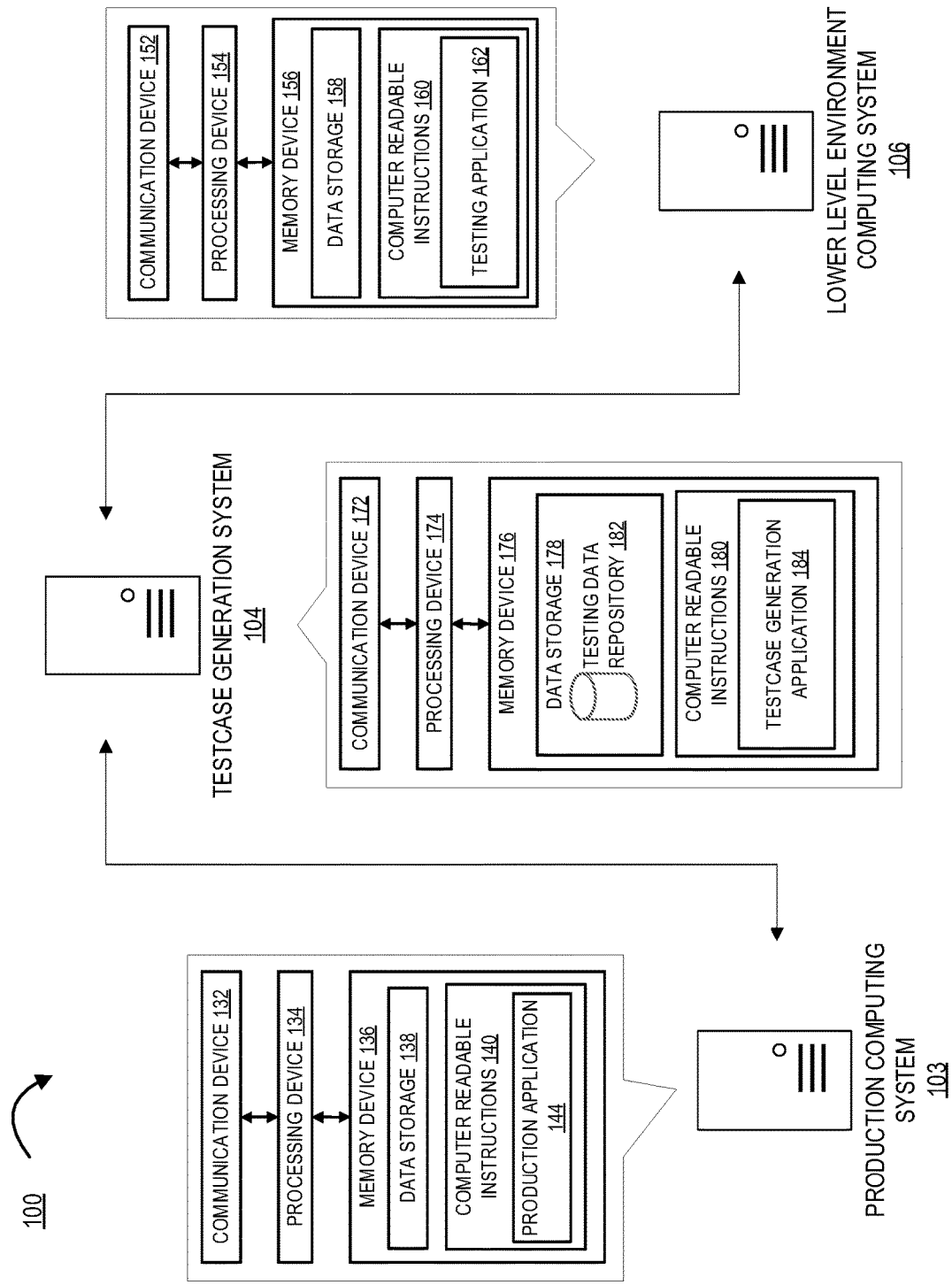
Figure 2:
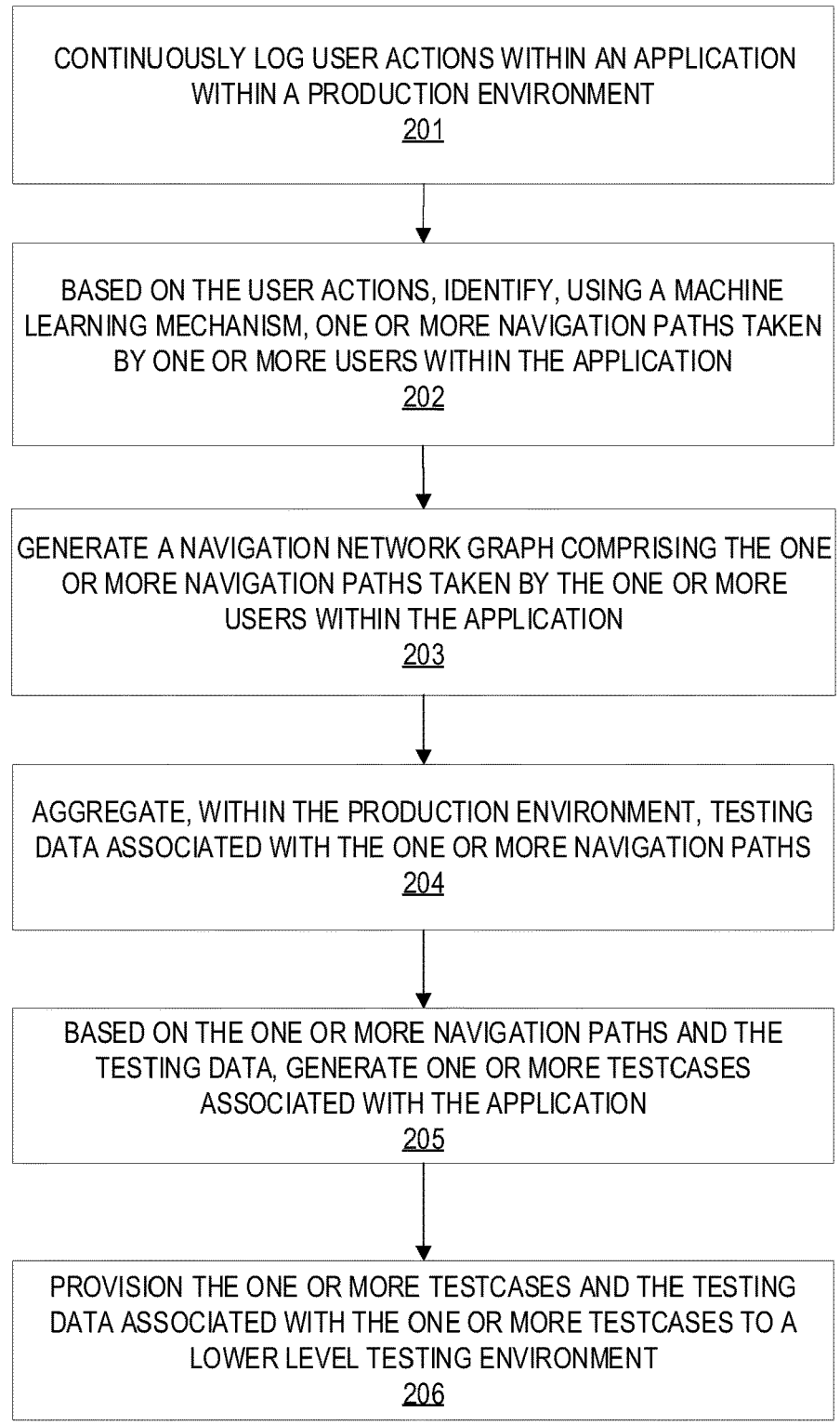

Having thus described embodiments of the invention in general terms, reference will now be made to the accompanying drawings, wherein:

FIG. 1 illustrates an operating environment for the test case generation system, in accordance with one embodiment of the present disclosure; and FIG. 2 illustrates a process flow for automatically generating test cases and testing data, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Data sanitization" or "sanitization" as used herein may refer to the removal of potentially sensitive information from production data for testing purposes. Examples of such sensitive information may include, for instance, personally identifiable information ("PII"), nonpublic information ("NPI"), data subject to regulations or standards (e.g., PCI DSS), or the like. Accordingly, data that has been sanitized may be referred to as "sanitized data."

"Testcase" or "test case" as used herein may refer to a particular scenario or situation to be tested during application development. For instance, an example of a test case may be an interaction of a user with the application to accomplish a particular objective of the user (e.g., view the user's account information).

"Test data" or "testing data" as used herein may refer to data that is processed by an application being tested during the development phase. In some embodiments, testing data may be generated from sanitized production data.

"Testing environment" or "lower level testing environment" ("LLE") as used herein may refer to a computing environment in which software or applications are developed, tested, and/or staged. Accordingly, applications within the LLE may require testing data and/or test cases to ensure the functionality and stability of the applications and features in development.

"Production environment" as described herein may refer to a computing environment in which the computing systems within the environment are currently in use to service the entity's operations. Accordingly, applications that have been deployed to the production environment may be considered to be "live."

During application development, it may be necessary to test the application with various types of data and scenarios to ensure that the application performs as expected in the production environment. That said, conventional methods for generating test cases and testing data may be a resource intensive process. Accordingly, the system as described herein provides a way to automatically generate test cases and testing data based on monitoring and logging activity within the application while it is deployed within the production environment. In particular, the applications in the production environment may monitor user activity within the application and maintain logs of each session in which the user interacts with the application. The logs may include information such as the type of device used to access the application (e.g., hardware, drivers, firmware, operating system, and the like), the software and/or method of access (e.g., mobile app, desktop app, web browser, or the like), the features or functions of the application accessed by the user (e.g., screens, interface elements, and the like), data inputted by the user and/or outputted to the user's computing system by the application, and the like.

The system may then, using an artificial-intelligence and/or machine learning based mechanism, map out the possible paths or flows that a user may take within an application to access certain features and functions. In this regard, the system may generate an application navigation network diagram (or flow graph), where each path may be expressed as one or more nodes (or "vertices") that are connected with one another by directional lines (or "edges") within the flow graph. For example, each screen that is presented to the user within the application (e.g., login screen, account overview screen, and the like) may be considered a "node." In such a scenario, each path may include the screens accessed by the user as well as the path direction (e.g., from screen 1 to screen 2) taken by the user when traversing the screens. In some embodiments, the navigation paths further comprise the order in which the screens were accessed during the user's session within the application.

Based on identifying the paths within the flow graph, the system may further identify which are the optimal paths (e.g., shortest in path length) to access a particular function of the application as well as the frequency of the various paths through which the users access the function. Furthermore, based on the frequency, the system may generate a ranked list of the most common paths taken by users within the production environment to access a function, where each path taken by the users may be considered a test case. In some embodiments, the system may further generate a list of paths ordered according to path length, where optimal paths appear at the top.

The system may then begin collecting testing data along the identified paths from the flow graph. The testing data may be, for instance, the types of data that may be processed by the developing application once it is deployed in the production environment. Accordingly, the testing data may include data information as a user name, contact information, account information, account history, and the like, that may be processed by the application for each path identified within the flow graph. In scenarios in which the testing data contains potentially sensitive information (e.g., PII), the testing data may be sanitized by the system to remove all sensitive information from the testing data before being introduced into the testing environment. Once the testing data has been collected, the testing data, along with the various network navigation paths identified using the flow graph, may be used by developers in the testing process (e.g., for regression testing).

An exemplary embodiment is provided for illustrative purposes. In one embodiment, an entity such as a financial institution may use the system to generate test cases and testing data to be used in the development of an account management application. In particular, the system may be used to assess both the optimum and most common paths that a user may take to access a transaction history screen associated with the user's account. In this regard, the system may create logs within the production environment of all user activity within the entity network that may relate to the account management application.

The system may then generate a flow graph of the various paths that a user may take to access the transaction history screen. From the flow graph, the system may determine the optimum (e.g., shortest) path for the user to reach the transaction history screen (e.g., open application, provide log-in credentials, then select the "transaction history" menu item). The system may further generate an ordered list of the most common paths that users may take to reach the transaction history screen, which may not necessarily be the optimum path. For example, in one embodiment, users may most commonly access the transaction history screen after first accessing a different screen within the main menu (e.g., account overview screen).

Subsequently, the system may collect testing data along the various paths as indicated in the flow graph. The system may further sanitize the testing data to remove potentially sensitive information before the testing data is permitted to be introduced into the testing environment. Once the testing data and test cases have been generated, the developers within the testing environment may perform testing on the application in development according to the development timeframe or circumstances. For instance, the test cases may be used to perform regression testing of the application along the most common paths that users take to access a certain function of the application (e.g., the transaction history screen).

The system as described herein confers a number of technological advantages over conventional methods for generating test cases. By harnessing the user activity of all users within an entity network (which may number in the millions for large systems), the system may be able to automatically generate test cases and testing data to achieve 100% or near 100% test case coverage in a way that cannot be feasibly accomplished by manual means. In turn, the efficiency of the application development process is greatly increased by saving resources that would have been used to manually generate the test cases and/or testing data.

Turning now to the figures, FIG. 1 illustrates an operating environment 100 for the test case generation system, in accordance with one embodiment of the present disclosure. In particular, FIG. 1 illustrates a test case generation system 104 that is operatively coupled, via a network, to a production computing system 103 and a lower level environment computing system 106. In such a configuration, the test case generation system 104 may transmit information to and/or receive information from the production computing system 103 and/or the lower level environment computing system 106. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, in some embodiments, the functions of the lower level environment computing system 106 and the test case generation system 104 may be performed by a single computing system. Furthermore, a single system, device, or server as depicted in FIG. 1 may represent multiple systems, devices, or servers. For instance, though the production computing system 103 and lower level environment computing system 106 are each depicted as single units, the operating environment may comprise multiple production computing systems 103 within the production environment and/or multiple lower level environment computing systems 106 within the lower level environment.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

The test case generation system 104 may be a computing system that performs the test case and testing data generation processes as described elsewhere herein. For instance, the test case generation system 104 may generate navigation network graphs from the logs created by the production computing system 103 and/or execute sanitization processes on the testing data. Accordingly, the test case generation system 104 may be a server on the network, though it is within the scope of the disclosure for the test case generation system 104 to be any other type of computing system as described herein. The test case generation system 104 may comprise a processing device 174 operatively coupled to a communication device 172 and a memory device 176, where the memory device 176 may comprise data storage 178 and computer readable instructions 180. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The computer readable instructions 180 of the test case generation system 104 may comprise a test case generation application 184 that may be configured to read data logs from the production computing system 103, use machine learning to generate navigation network graphs, sanitize testing data, and provision the sanitized testing data and/or test cases to the lower level environment computing system 106.

Accordingly, a testing data repository 182 may be stored within the data storage 178 of the test case generation system 104, where the testing data repository 182 may contain sanitized testing data, test cases, and/or flow graphs. The lower level environment computing system 106 may be configured to access the testing data repository and pull the data therein to test the developing application.

The production computing system 103 may be a computing system within the production environment of an entity's networked systems and is currently being used by the entity to execute processes related to the entity's objectives. In some embodiments, the production computing system 103 may be a computing device operated by a user, such as an administrator, agent, or employee of the entity. In such embodiments, the production computing system 103 may be a device such as a desktop computer, laptop, IoT device, smartphone, tablet, single-board computer, or the like, and may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like). In other embodiments, the production computing system 103 may be a "headless" computing device such as a networked server.

The production computing system 103 may comprise a processing device 134 operatively coupled to a communication device 132 and a memory device 136 having data storage 138 and computer readable instructions 140 stored thereon, where the computer readable instructions 140 may comprise a production application 144. The production application 144 may be a currently deployed application that may store and/or process various types of application-related data (e.g., production data). In this regard, the test case generation system 104 may be configured to generate copies of the production data within the production computing system 103 and transform the production data into testing data using the processes as described elsewhere herein. In some embodiments, the production application 144 may further generate logs of user activity (e.g., navigation within the production application 144) and provide the logs to the test case generation system 104 to be used in generating the network navigation graphs. In this regard, the production application 144 may further be configured to collect test data along the flow paths within the network navigation graphs generated by the test case generation system 104.

The lower level environment computing system 106 may be a computing system which may be used within the lower level environment of an entity's network for the purpose of developing and testing software applications. Accordingly, the lower level environment computing system 106 may comprise a communication device 152, a processing device 154, and a memory device 156. The lower level environment computing system 106 may be a device such as a networked server, desktop computer, terminal, kiosk, or any other type of computing system as described herein.

The processing device 154 may be operatively coupled to the communication device 152 and the memory device 156 such that the processing device 154 uses the communication device 152 to communicate with the network and other devices on the network, such as, but not limited to the production computing system 103 and the test case generation system 104. In this regard, the communication device 152 generally comprises a modem, antennae, WiFi or Ethernet adapter, radio transceiver, or other device for communicating with other devices on the network.

The memory device 156 may have computer-readable instructions 160 stored thereon, where the computer readable instructions 160 further comprises a testing application 162. The testing application 162 may be an application that is currently in development and being tested before being deployed to the production environment. In some embodiments, the testing application 162 may be a new version of the production application 144. Accordingly, the lower level environment computing system 106 may receive testing data and/or test cases from the testing data repository 182 for the purposes of conducting the application testing (e.g., regression testing of the new version).

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for automatically generating test cases and testing data, in accordance with some embodiments of the present disclosure. The process 200 begins at block 201, where the system continuously logs user actions within an application within a production environment. In this regard, the system may log each user session associated with the application, where the logs may also comprise information such as devices and/or operating systems used to access the application, the number of users accessing the application, the timestamps and/or timeframes of actions taken by the users, user inputs and/or interactions with interface elements (e.g., mouse clicks and/or selections, touches or strokes on capacitive touch screens, key strokes, and the like), and the like.

The process continues to block 202, where the system, based on the user actions, identifies, using a machine learning mechanism, one or more navigation paths taken by one or more users within the application. In some embodiments, the navigation paths taken by the users may be constructed based on the screens of the application accessed by the users along with a directionality or order in which the screens are accessed by the users. In such scenarios, the system may calculate all possible screens through which the user may navigate to access a particular function of the application.

In an exemplary embodiment, an entity such as a financial institution may host an account management application within the production environment that may allow users to perform functions such as view or edit account information, execute transactions, view transaction history, or the like. In some embodiments, each function of the account management application may be presented within the application on separate screens. In such embodiments, the system may log navigation paths that the users take to access certain functions and/or screens of the application. For instance, in order to reach a particular screen (e.g., the transaction history screen), users may navigate through one series of intermediate screens (e.g., sign-in screen, authentication screen, account overview screen, and the like). That said, other users may navigate through another series of screens (e.g., sign-in screen, authentication screen, then the transaction history screen). By tracking all user activity within the application, the system may be able to identify 100% or near 100% of the paths that a user may take to reach a certain screen or function.

The process continues to block 203, where the system generates a navigation network graph comprising the one or more navigation paths taken by the one or more users within the application. In some embodiments, the navigation network graph may be stored within a graph database wherein each screen of the application through which a user navigates may be stored as a node, whereas the connections between the various screens may be stored as edges. The navigation network graph may indicate the optimum path (e.g., shortest path) that a user may take to reach a particular screen.

The process continues to block 204, where the system aggregates, within the production environment, testing data associated with the one or more navigation paths. The testing data may include various types of information about the user and/or the user's actions. Continuing the above example, the testing data may include information such as the user's name, account number, account information, transaction data and/or history, contact information, and the like. The testing data may further comprise information regarding the user's computing device used to access the application (e.g., platform, operating system, system architecture, and the like). In some embodiments, the system may sanitize the testing data before allowing developers to access the testing data. In this regard, the system may remove all potentially sensitive data (e.g., PII) from the testing data and/or replace the fields with synthetic, non-identifying data. Once the testing data has been sanitized, the system may allow the testing data to be introduced into the lower level environment.

The process continues to block 205, where the system, based on the one or more navigation paths and the testing data, generates one or more test cases associated with the application. In some embodiment, each potential navigation path may be considered by the system to be a test case. In this regard, each test case along with the corresponding testing data (e.g., user session and/or system information) may be used by the developers to perform testing on the developing application. In some embodiments, the system may further generate an list of navigation paths ordered by frequency such that the most commonly traveled paths appear first. In such scenarios, each navigation path may be associated with a counter indicating the number of times that a particular navigation path was taken by a user within the production environment.

The process continues to block 206, where the system provisions the one or more test cases and testing data associated with the one or more test cases to a lower level testing environment. In some embodiments, the system may further provide information regarding optimal or most frequently traversed navigation paths. For example, the system may provide a list of navigation paths which highlights the optimal (e.g., shortest) path to particular screens as well as the most commonly used paths to particular screens. In this way, the application developer may be able to prioritize application testing to cover at least the optimal and/or most frequent test cases.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for mobile log heatmap-based auto test case generation, the system comprising:
   a memory device with computer-readable program code stored thereon;
   a communication device; and
   a processing device operatively coupled to the memory device and the communication device, wherein the processing device is configured to execute the computer-readable program code to:
      continuously log user actions within an application within a production environment;
      based on the user actions, identify, using a machine learning mechanism, one or more navigation paths taken by one or more users within the application;
      generate a navigation network graph comprising the one or more navigation paths taken by the one or more users within the application;
      determine, using the machine learning mechanism, an optimum navigation path from the one or more navigation paths, wherein the optimum navigation path comprises a shortest navigation path to a function within the application;
      aggregate, within the production environment, testing data associated with the one or more navigation paths, wherein the testing data represents data that is processed by the application within the production environment, wherein the testing data comprises user names, account information, transaction information, and user computing device information, wherein the user computing device information comprises platform information, operating system information, and system architecture information, wherein aggregating the testing data comprises:
         generating one or more copies of a set of production data within the production environment;
         identifying the one or more navigation paths within the production data; and
         transforming the production data into the testing data based on the one or more navigation paths;
      based on the one or more navigation paths and the testing data, generate one or more test cases associated with the application, wherein each test case is associated with a navigation path of the one or more navigation paths taken by the one or more users, wherein the one or more test cases comprises the optimum navigation path and a most commonly traversed navigation path by the one or more users within the application; and
      provision the one or more test cases and the testing data associated with the one or more test cases to a lower level testing environment, wherein provisioning the one or more test cases and the testing data comprises:
         generating an ordered list of the one or more test cases, wherein the one or more test cases are ordered from most frequently traversed navigation paths of the one or more navigation paths to least frequently traversed of the one or more navigation paths, wherein each test case is associated with a counter indicating a number of times that the navigation path associated with each test case has been traversed by the one or more users; and
         provisioning the ordered list of the one or more test cases to the lower level testing environment.

2. The system according to claim 1, wherein provisioning the one or more test cases and the testing data associated with the one or more test cases comprises:
   detecting sensitive information within the testing data associated with the one or more test cases; and
   replacing the sensitive information with synthetic data to generate sanitized testing data.

3. The system according to claim 1, wherein each of the one or more navigation paths comprises one or more screens within the application and one or more path directions between the one or more screens within the application.

4. The system according to claim 3, wherein the navigation network graph is stored in a graph database, wherein each of the one or more screens within the application are stored as a node within the graph database, wherein each of the one or more path directions are stored as an edge within the graph database.

5. The system according to claim 1, wherein the testing data associated with the one or more navigation paths comprises user session information and system information.

6. A computer program product for mobile log heatmap-based auto test case generation, the computer program product comprising at least one non-transitory computer readable medium having computer-readable program code portions embodied therein, the computer-readable program code portions comprising executable code portions for:
   continuously logging user actions within an application within a production environment;
   based on the user actions, identifying, using a machine learning mechanism, one or more navigation paths taken by one or more users within the application;
   generating a navigation network graph comprising the one or more navigation paths taken by the one or more users within the application;
   determining, using the machine learning mechanism, an optimum navigation path from the one or more navigation paths, wherein the optimum navigation path comprises a shortest navigation path to a function within the application;
   aggregating, within the production environment, testing data associated with the one or more navigation paths, wherein the testing data represents data that is processed by the application within the production environment, wherein the testing data comprises user names, account information, transaction information, and user computing device information, wherein the user computing device information comprises platform information, operating system information, and system architecture information, wherein aggregating the testing data comprises:
      generating one or more copies of a set of production data within the production environment;
      identifying the one or more navigation paths within the production data; and
      transforming the production data into the testing data based on the one or more navigation paths;
   based on the one or more navigation paths and the testing data, generating one or more test cases associated with the application, wherein each test case is associated with a navigation path of the one or more navigation paths taken by the one or more users, wherein the one or more test cases comprises the optimum navigation path and a most commonly traversed navigation path by the one or more users within the application; and provisioning the one or more test cases and the testing data associated with the one or more test cases to a lower level testing environment, wherein provisioning the one or more test cases and the testing data comprises:

generating an ordered list of the one or more test cases, wherein the one or more test cases are ordered from most frequently traversed navigation paths of the one or more navigation paths to least frequently traversed of the one or more navigation paths, wherein each test case is associated with a counter indicating a number of times that the navigation path associated with each test case has been traversed by the one or more users; and provisioning the ordered list of the one or more test cases to the lower level testing environment.

7. The computer program product according to claim 6, wherein provisioning the one or more test cases and the testing data associated with the one or more test cases comprises:

detecting sensitive information within the testing data associated with the one or more test cases; and replacing the sensitive information with synthetic data to generate sanitized testing data.

8. The computer program product according to claim 6, wherein each of the one or more navigation paths comprises one or more screens within the application and one or more path directions between the one or more screens within the application.

9. The computer program product according to claim 8, wherein the navigation network graph is stored in a graph database, wherein each of the one or more screens within the application are stored as a node within the graph database, wherein each of the one or more path directions are stored as an edge within the graph database.

10. A computer-implemented method for mobile log heatmap-based auto test case generation, wherein the computer-implemented method comprises:

continuously logging user actions within an application within a production environment;

based on the user actions, identifying, using a machine learning mechanism, one or more navigation paths taken by one or more users within the application;

generating a navigation network graph comprising the one or more navigation paths taken by the one or more users within the application;

determining, using the machine learning mechanism, an optimum navigation path from the one or more navigation paths, wherein the optimum navigation path comprises a shortest navigation path to a function within the application;

aggregating, within the production environment, testing data associated with the one or more navigation paths, wherein the testing data represents data that is processed by the application within the production environment, wherein the testing data comprises user names, account information, transaction information, and user computing device information, wherein the user computing device information comprises platform information, operating system information, and system architecture information, wherein aggregating the testing data comprises:

generating one or more copies of a set of production data within the production environment;

identifying the one or more navigation paths within the production data; and transforming the production data into the testing data based on the one or more navigation paths;

based on the one or more navigation paths and the testing data, generating one or more test cases associated with the application, wherein each test case is associated with a navigation path of the one or more navigation paths taken by the one or more users, wherein the one or more test cases comprises the optimum navigation path and a most commonly traversed navigation path by the one or more users within the application; and provisioning the one or more test cases and the testing data associated with the one or more test cases to a lower level testing environment, wherein provisioning the one or more test cases and the testing data comprises:

generating an ordered list of the one or more test cases, wherein the one or more test cases are ordered from most frequently traversed navigation paths of the one or more navigation paths to least frequently traversed of the one or more navigation paths, wherein each test case is associated with a counter indicating a number of times that the navigation path associated with each test case has been traversed by the one or more users; and provisioning the ordered list of the one or more test cases to the lower level testing environment.

11. The computer-implemented method according to claim 10, wherein provisioning the one or more test cases and the testing data associated with the one or more test cases comprises:

detecting sensitive information within the testing data associated with the one or more test cases; and replacing the sensitive information with synthetic data to generate sanitized testing data.

12. The computer-implemented method according to claim 10, wherein each of the one or more navigation paths comprises one or more screens within the application and one or more path directions between the one or more screens within the application.

13. The computer-implemented method according to claim 12, wherein the navigation network graph is stored in a graph database, wherein each of the one or more screens within the application are stored as a node within the graph database, wherein each of the one or more path directions are stored as an edge within the graph database.

14. The computer-implemented method according to claim 10, wherein the testing data associated with the one or more navigation paths comprises user session information and system information.

* * * * *